(12) United States Patent
Mayer

(10) Patent No.: US 6,637,724 B1
(45) Date of Patent: Oct. 28, 2003

(54) VALVE, ESPECIALLY FOR SLIP-CONTROLLED HYDRAULIC BRAKE SYSTEMS INSTALLED IN MOTOR VEHICLES

(75) Inventor: Franz Mayer, Haldenwang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/936,218

(22) PCT Filed: Mar. 3, 2000

(86) PCT No.: PCT/DE00/00684

§ 371 (c)(1),
(2), (4) Date: Jan. 18, 2002

(87) PCT Pub. No.: WO00/53474

PCT Pub. Date: Sep. 14, 2000

(30) Foreign Application Priority Data

Mar. 9, 1999 (DE) .......................................... 199 10 207

(51) Int. Cl.$^7$ ............................................... F16K 31/02
(52) U.S. Cl. ............................... 251/129.15; 251/129.01
(58) Field of Search ....................... 251/129.15, 129.01; 303/119.2, 119.1

(56) References Cited

U.S. PATENT DOCUMENTS 5,542,755 A * 8/1996 Staib et al. ............... 303/119.2
6,427,972 B1 * 8/2002 Kirschner .............. 251/129.15

FOREIGN PATENT DOCUMENTS

DE    3024435 A1 * 1/1982

* cited by examiner

Primary Examiner—Gene Mancene
Assistant Examiner—John Bastianelli
(74) Attorney, Agent, or Firm—Ronald E. Greigg

(57) ABSTRACT

An electromagnetically actuated valve has a sleeve which receives magnetically operative elements, such as an armature and a magnet core. The sleeve is provided with a radially outward-oriented, encompassing widened portion in the form of a flange having flat wall portions which extend transversely to the longitudinal axis of the valve and rest on one another essentially without an interstice between them. The flange is braced on a shoulder of a valve block bore and is hydraulically tightly gripped by material positively displaced from the bore circumference. The flange is the sole securing means for the fluid-carrying part of the valve, which part comprises the sleeve, armature and magnet core.

3 Claims, 1 Drawing Sheet

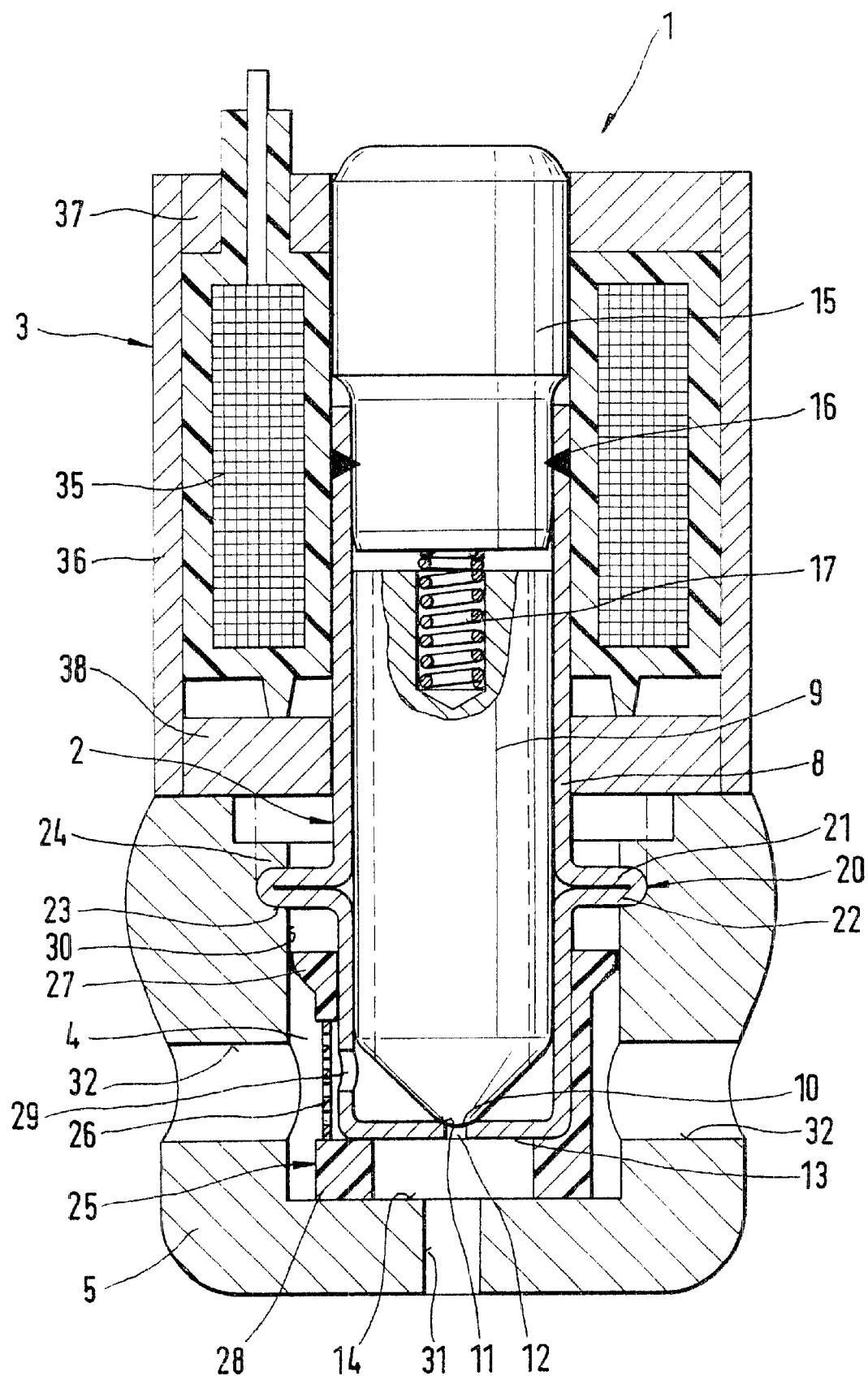

VALVE, ESPECIALLY FOR SLIP-CONTROLLED HYDRAULIC BRAKE SYSTEMS INSTALLED IN MOTOR VEHICLES

BACKGROUND OF THE INVENTION

1. Field of the Invention

The invention is based on an electromagnetically actuated valve especially suited for use in connection with slip controlled hydraulic brake systems of motor vehicles.

2. Description of the Prior Art

One such valve is already known from German Patent Disclosure DE 43 37 435 A1. This valve has a sleeve for an armature and a magnet core. The sleeve extends through a bush. On the inside circumference, this bush has an encompassing widened portion, which is engaged by the sleeve with an encompassing, beadlike widened portion of its jacket wall. This axially secures the sleeve to the bush. The bush in turn is provided with a radially outward-extending flange. Together with a portion of the sleeve, this flange engages a bore of a valve block. By means of material comprising the valve block positively displaced by the circumference of the bore toward the orifice, the bush is secured by means of its flange to the valve block in a fluid-tight manner. To seal off the connection between the sleeve and the bush, a support ring that rests on the flange of the sleeve and a sealing ring that engages the sleeve on one end and the inside circumference of the bore on the other are provided in the bore.

The known valve has the disadvantage that the sleeve is secured to the valve block with the expensive intermediate part, that is, the bush, and the connection between the sleeve and the bush is not tight and therefore requires expensive sealing between the support ring and the sealing ring.

From German Patent Disclosure DE 30 24 435 A1, a valve is known that has a sleeve for an armature. The sleeve has a widened portion for engagement by a union nut, with which the sleeve is held down against a sealing ring.

SUMMARY OF THE INVENTION

A valve according to the invention has the advantage over the prior art that additional provisions for sealing off the sleeve can be dispensed with, and no components for securing the sleeve in the bore of the valve block are needed, since the sleeve has a shaping which allows it to be secured directly in the bore of the valve block. The flat wall portions of the flange embodied on the sleeve form sealing faces, one of which is braced two-dimensionally on a shoulder of the bore, and the other of which is gripped in fluid-tight fashion by material comprising the valve block. Because of the embodiment of the flange as an interstice-free crease, the wall thickness of the flange is doubled at its fastening point in the bore of the valve block, which has a favorable effect on the fastening rigidity and strength.

Another feature of the valve in comparison with the known valve, which has a valve body with a valve seat in the sleeve, a further reduction in the number of parts is attained.

A further feature is advantageous in the sense that with the filter element, not only a forced carrying of fluid through the filter openings, but also a separation on the inlet and outlet sides of the flow courses to and from the valve seat is attained.

BRIEF DESCRIPTION OF THE DRAWING

One exemplary embodiment of the invention is shown in the single drawing which is a longitudinal section through an electromagnetically actuated valve.

DESCRIPTION OF THE PREFERRED EMBODIMENTS

An electromagnetically actuated valve 1, hereinafter called a magnet valve, shown in the drawing substantially comprises two component groups, namely a fluid-carrying part 2, hereinafter called the hydraulic part, and an electric part 3. The hydraulic part 2 is received over a part of its length in a bore 4 of a valve block 5. The electric part 3 is slipped onto the hydraulic part 2 that protrudes from the valve block 5. The magnet valve 1 embodied as a 2/2-way valve is a component for instance of a hydraulic unit, not shown, for slip-controlled hydraulic brake systems of motor vehicles.

The hydraulic part 2 has a thin-walled sleeve 8, in which a longitudinally movably guided armature 9 is received. The armature, on its end portion located at the bottom in the drawing, tapers conically, and ends in a spherically embodied closing body 10. Associated with the closing body 10 is a valve seat 11, which surrounds an opening 12, coaxial with the longitudinal axis of the valve, in a flat bottom 13 of the sleeve 8. The bottom 13 of the sleeve 8 extends in spaced-apart fashion above a bottom 14 of the valve block bore 4. Remote from the bottom, the sleeve 8 is closed by a magnet core 15 that fits partway into the sleeve. The magnet core 15 is connected in fluid-tight fashion to the sleeve 8 by an encompassing weld seam 16. A restoring spring 17, which is braced on one end on the armature 9 and on the other on the magnet core 15, is also received in the sleeve 8. In the basic position shown for the magnet valve 1, the closing body 10 on the armature 9 keeps the opening 12 of the sleeve bottom 13 closed.

The sleeve 8, at a distance from its bottom 13, is widened into a radially outward-oriented, encompassing flange 20. The flange 20 is embodied as a crease of the sleeve 8 and has two flat wall portions 21 and 22, extending transversely to the longitudinal axis of the valve, which rest on one another essentially without an interstice and which change over, with transitions of short radius, to one another or to the hollow-cylindrical part of the sleeve 8 above and below the flange, respectively. The flange 20 of the sleeve 8 is created by reshaping, such as upsetting of the sleeve. The sleeve 8 is secured in the bore 4 of the valve block 5 by means of the flange 20. To that end, on the orifice side, the bore 4 is provided with a shoulder 23, whose outer diameter, represented by dot-dashed lines in the drawing, is equivalent to that of the flange 20. The flange 20 of the sleeve 8 is braced two-dimensionally with its wall portion 22 on the shoulder 23 of the bore 4. By positive displacement of material from the circumference, toward the orifice, of the bore 4, the other wall portion 21 of the flange 20 is hydraulically tightly gripped by an encompassing bead 24 of material. The flange 20 and the bead 24 of material form the sole means for securing the hydraulic part 2 to the valve block 5.

A cup-shaped filter element of plastic is slipped onto the portion of the sleeve 8 that extends between the flange 20 and the bottom 13. This filter element has filter openings 26 on its circumference and toward the flange and the sleeve bottom it has a respective annular collar 27 and 28. The filter openings 26 of the filter element 25 are associated with an aperture 29 of the sleeve 8, which is located between the bottom 13 and the flange 20 and acts as a valve inlet or valve outlet. The annular collar toward the flange on one end engages the sleeve 8, between the aperture 29 and the flange 20, and on the other engages a circumferential wall 30 of the valve block bore 4. The other annular collar 28 hydraulically tightly engages the bottom 13 of the sleeve 8 and the bottom 14 of the bore 4. The annular collar 28 furthermore disconnects conduits 31 and 32 of the valve block 5, which on the bottom and circumference discharge into the valve block bore 4 and communicate in fluid-carrying fashion with the opening 12 and the aperture 29 of the sleeve 8, respectively.

The electric part 3 slipped onto the hydraulic part 2 substantially comprises an electrical coil 35, which is enveloped on the circumference by a flow-carrying coil housing 36 and on the face end by flow-carrying annular disks 37 and 38. By excitation of the electrical coil 35, a magnetic field acting on the magnetically operative elements, that is, the armature 9 and the magnet core 15, of the coil 8 is created, on the basis of which the armature 9 is attracted to the magnet core 15, counter to the force of the restoring spring 17, and the closing body 10 of the armature uncovers the opening 12 on the bottom 13 of the sleeve 8. Fluid can flow from the conduit 32 through the aperture 29 and the opening 12 in the sleeve 8 to the conduit 31, or vice versa. Switching off the excitation of the coil 35 causes the armature 9, under the influence of the restoring spring 17, to drop from the magnet core 15, so that the closing body 10 of the armature 9 blocks the opening 12 on the bottom 13 of the sleeve 8.

The foregoing relates to preferred exemplary embodiments of the invention, it being understood that other variants and embodiments thereof are possible within the spirit and scope of the invention, the latter being defined by the appended claims.

What is claimed is:

1. An electromagnetically actuated valve (1), in particular for slip-controlled hydraulic brake systems of motor vehicles, comprising a sleeve (8) containing magnetically operative elements including an armature (9) and a magnet core (15), said sleeve having a radially outward-oriented encompassing widened flange (20) for securing the fluid-carrying part (2) of the valve (1) in a bore (4) of a valve block (5), said radially extending flange (20) being braced on a shoulder (23) of the bore (4) and being hydraulically tightly gripped by material positively displaced from the bore circumference, said flange (20) being formed by a widened portion of the sleeve (8) having flat wall portions (21, 22), extending transversely to the longitudinal axis of the valve, and which rest on one another essentially without an interstice between them.

2. The valve of claim 1, wherein said sleeve (8) has a bottom (13), in which an opening (12), coaxial with the longitudinal axis of the valve, having a valve seat (11) is embodied, and an aperture (29) disposed circumferentially on the sleeve (8) between the bottom (13) and the flange (20) providing a valve inlet or valve outlet.

3. The valve of claim 2, further comprising a cup-shaped filter element (25) mounted onto the bottom portion of said sleeve (8), said filter element having circumferential filter openings (26) as well as a pair of annular collars (27, 28) one each toward said flange and toward said sleeve bottom, respectively, said annular collar (27) toward said flange 20 engaging said sleeve (8) between said aperture (29) and said flange and engaging the circumferential wall (30) of said valve block bore (4), and the other annular collar (28) hydraulically tightly engaging both the bottom (13) of said sleeve (8) and the bottom (14) of said valve block bore (4), into which bore, fluid-carrying conduits (31, 32) of the valve block (5) that communicate on the bottom with the opening (12) in the sleeve (8) and on the circumference with the aperture (29) discharge.

* * * * *